(12) United States Patent
Adams (10) Patent No.: US 6,602,076 B2
(45) Date of Patent: Aug. 5, 2003

(54) METHOD OF TEACHING THROUGH EXPOSURE TO RELEVANT PERSPECTIVE

(75) Inventor: Tony Adams, Overland Park, KS (US)

(73) Assignee: Discovertheoutdoors.com, Inc., Overland Park, KS (US)

( * ) Notice: Subject to any disclaimer, the term of this patent is extended or adjusted under 35 U.S.C. 154(b) by 0 days.

(21) Appl. No.: 09/998,990

(22) Filed: Nov. 29, 2001

(65) Prior Publication Data

US 2003/0099921 A1 May 29, 2003

Related U.S. Application Data (63) Continuation-in-part of application No. 09/990,649, filed on Nov. 20, 2001.

(51) Int. Cl.$^7$ .................. G09B 19/00; A63B 69/00; A63B 69/36

(52) U.S. Cl. ............... 434/236; 434/219; 434/247; 434/252

(58) Field of Search ................ 434/29–72, 79, 434/80, 91, 130–153, 219–226, 234–238, 247–303, 305, 308–318

(56) References Cited

U.S. PATENT DOCUMENTS

| | | | |
|---|---|---|---|
| 5,923,330 A | * | 7/1999 | Tarlton et al. ............... 345/419 |
| 6,215,498 B1 | * | 4/2001 | Filo et al. ................... 345/419 |
| 6,224,387 B1 | * | 5/2001 | Jones ......................... 434/252 |
| 2002/0082077 A1 | * | 6/2002 | Johnson et al. ............... 463/30 |

OTHER PUBLICATIONS

Ron Zemke, "Can Games and Simulations Improve Your Training Power?/But Will Trainees Play Them?", Training, Feb. 1982.*
Alan Bavley, "Simulator Program Puts Doctors in Patients' Shoes", Chicago Tribune, Dec. 1998.*
Patrick McMahon, "'Real–World' Simulations Keep Cops Sharp", USA Today, Aug. 1999.*
"Game Review:Swatting the Bad Guys: Ex–LAPD Police Chief Helps Make SWAT3 a Realistic Experience", Bangkok Post, Apr. 2000.*
David Ibata, "Simulator Aims to Put Railroading on Fast Track", Chicago Tribune, Jun. 2001.*
Tim Wapshott, "Tim Wapshott's Choice", The Times, London, Jul. 2001.*

* cited by examiner

*Primary Examiner*—John Edmund Rovnak
(74) *Attorney, Agent, or Firm*—Hovey Williams LLP (57) ABSTRACT

A method of teaching a skill, such as, for example, hunting, tracking, law enforcement, terrorist response, self-defense, or game-playing technique, whereby the student is exposed to the perspective of a relevant person, animal, or object, such as, for example, a game player, victim, criminal, terrorist, animal, or ball, whose identity is determined by the nature of the skill, and wherein a mechanism, such as, for example, video, computer animation, virtual reality, or role-playing, is used to impart the perspective. The method broadly comprises the steps of identifying a behavior of the thing, wherein the behavior is related to the skill; modeling a perspective of the thing related to the behavior in terms understandable by the student; implementing the model using a suitable mechanism; and introducing the student to the mechanism such that, through the mechanism, the student is able to experience the perspective of the thing and to thereby better understand the behavior and the skill.

30 Claims, 7 Drawing Sheets

METHOD OF TEACHING THROUGH EXPOSURE TO RELEVANT PERSPECTIVE

RELATED APPLICATIONS

This application is a continuation-in-part and claims priority benefit, with regard to all common subject matter, of a non-provisional application titled "Method of Teaching Through Exposure to Relevant Perspective", Ser. No. 09/990,649, filed Nov. 20, 2001.

BACKGROUND OF THE INVENTION

1. Field of the Invention

The present invention relates to methods of teaching wherein the student is exposed to or experiences the perspective of a relevant person, animal, or object. More particularly, the present invention concerns a method of teaching a skill, such as, for example, hunting, tracking, law enforcement, terrorist response, self-defense, or game-playing technique, whereby the student is exposed to or otherwise experiences the perspective of a relevant person, animal, or object, such as, for example, a game player, victim, criminal, terrorist, animal, or ball, whose identity is determined by the nature of the skill, and wherein a mechanism, such as, for example, prerecorded video, computer animation, virtual reality, role-playing, or a similar mechanism, is used to impart the perspective to the student.

2. Description of the Prior Art

It is often helpful when learning a skill to consider and appreciate the environment and context in which the skill is performed. A hunter learning proper duck hunting techniques, for example, must learn to properly camouflage a blind or other concealed shelter or area from which the hunter will observe and shoot; arrange duck decoys in a realistic and effective pattern on a pond or other body of water; and make realistic and appropriate duck calls at the proper times. Unfortunately, the hunter will typically be taught such techniques from a two-dimensional human perspective which may provide inadequate insight into the efficacy of the hunter's endeavors and any actual effects stemming therefrom.

Similarly, a golfer, for example, may intellectually comprehend a need to account for wind shear when driving or to account for ground contours when putting, but may lack a fundamental understanding or appreciation of potential forces which might act on the ball. Without such understanding, the golfer can never fully learn or appreciate proper driving or putting techniques.

Similarly, in law enforcement or terrorist response, for example, a number of techniques, including, for example, close-quarter combat with edged weapons, suspect interrogation, and arrest procedures, are taught from a third-party perspective, wherein a law enforcement officer or other student merely observes participants demonstrating proper movements, actions, or other techniques. Unfortunately, though the law enforcement officer may comprehend these lessons on a sterile intellectual level, it is unlikely that such passive, non-participatory observation will impart a fundamental understanding or appreciation of the victim's, aggressor's, criminal's, or terrorist's view, behavior, or thoughts. Without such a fundamental understanding or appreciation, it is further unlikely that the law enforcement officer will develop the insight and intuition needed to maximize his or her performance of a wide variety of law enforcement skills, including, for example, self-defense, investigatory, and procedural skills.

Due to the above-identified and other problems and disadvantages in the art, a need exists for an improved method of teaching a skill such as hunting or sporting techniques.

SUMMARY OF THE INVENTION

The present invention provides a distinct advance in the art of teaching. More particularly, the present invention concerns a method of teaching a skill, such as, for example, hunting, tracking, law enforcement, terrorist response, self-defense, or game-playing technique, whereby a student is exposed to or otherwise experiences a perspective of a relevant thing, whether person, animal, or object, such as, for example, a game player, victim, criminal, terrorist, animal, or ball, whose identity is determined by the nature of the skill, and wherein a mechanism, such as, for example, prerecorded video, computer animation, virtual reality, role-playing, or a similar mechanism, is used to impart the perspective to the student.

In a preferred embodiment, the method broadly comprises the general steps of identifying a behavior of the thing, wherein the behavior is related to the skill; modeling a perspective of the thing related to the behavior in terms understandable by the student; implementing the model using an appropriate mechanism; and introducing the student to the mechanism such that, through the mechanism, the student is exposed to or otherwise experiences the perspective of the thing and is thereby better able to understand the behavior. It will be appreciated that an understanding or better understanding of the behavior will result in the learning of or improvement in performance of the skill.

As mentioned, in prior art teaching methods the student is faced with learning the skill without truly understanding or developing a fundamental appreciation of why certain things are done the way they are. The present invention advantageously provides exposure to and appreciation of a perspective which is helpful to the student in performing the skill. In duck hunting, for example, it is advantageous to understand the behaviors and perspectives of a duck. Similarly, in the game of golf it is advantageous to understand the behaviors and perspectives of a skilled player. Similarly, for the law enforcement officer, soldier, prison guard, security guard, airline pilot, and airline flight attendant it is advantageous to understand and appreciate the perspectives of victims, criminals, terrorists, enemy soldiers, or aggressors, as applicable, in order to develop the insight and intuition needed to maximize his or her performance of a wide variety of relevant skills. Furthermore, as provided for by the present invention, it is even more beneficial to experience the perspectives of both of two or more persons involved in an event, such as, for example, the perspectives of both the attacked person and the attacker.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

The present invention concerns a method of teaching a skill, such as, for example, hunting, tracking, law enforcement, terrorist response, self-defense, or game-playing technique, whereby a student is exposed to or otherwise experiences a perspective of a relevant thing, whether person, animal, or object, such as, for example, a game player, victim, criminal, terrorist, animal, or ball, whose identity is determined by the nature of the skill, and wherein a mechanism, such as, for example, prerecorded video, computer animation, virtual reality, role-playing, or a similar mechanism, is used to impart the perspective.

Figure 1:
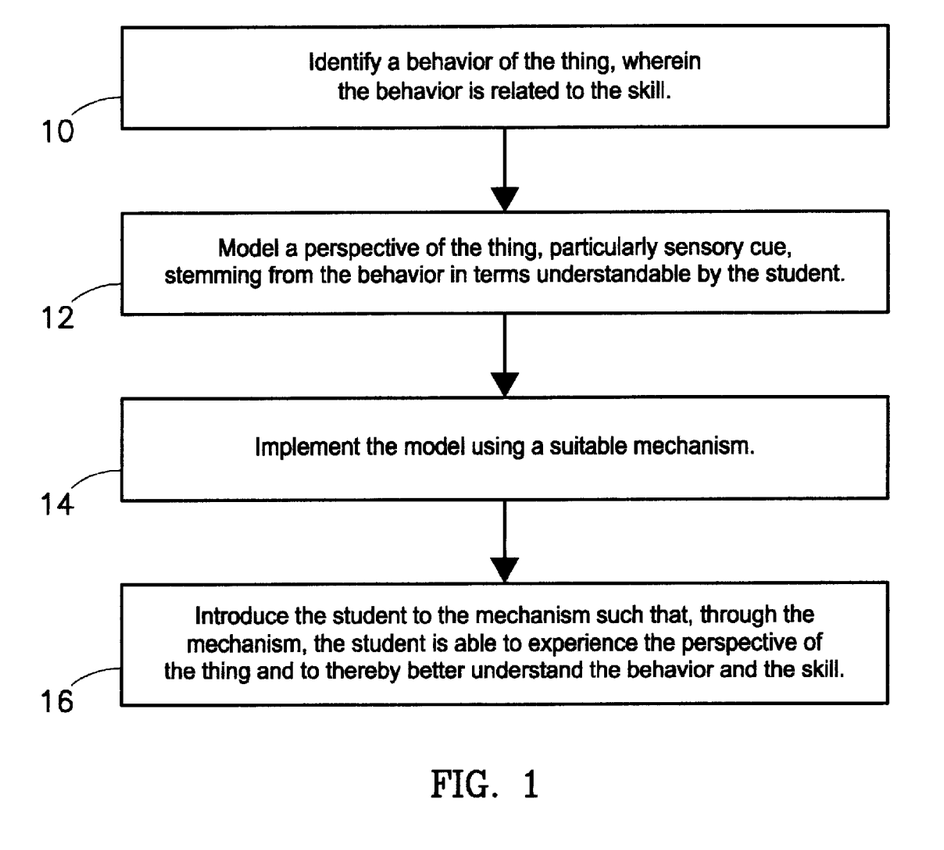
FIG. 1 is a flowchart showing a first sequence of general steps in a preferred embodiment of the present invention.

Referring to FIG. 1, the method broadly comprises the general steps of identifying a behavior of the thing, wherein the behavior is related to the skill, as depicted in box 10; modeling the perspective of the thing related to the behavior in terms understandable by the student, as depicted in box 12; implementing the model using an appropriate mechanism, as depicted in box 14; and introducing the student to the mechanism such that, through the mechanism, the student is exposed to or otherwise experiences the perspective of the thing and is thereby better able to understand the behavior, as depicted in box 16. It will be appreciated that an understanding or better understanding of the behavior will result in the learning of or improvement in the performance of the skill.

The step of identifying the behavior of the thing, wherein the behavior is related to the skill, as depicted in box 10, involves identifying one or more actions or reactions or other behaviors exhibited by the thing in relation to the skill. It is this behavior that the student must experience and understand in order to improve in the skill. For example, referring also to FIG. 2, if the skill to be taught is duck hunting, including creating and camouflaging a blind 20 and lying-in-wait near a pond 22 or other potential landing area, then the thing is a duck 24 and the behavior is the duck's behavior in relation to the blind 20 and the hunter's efforts at lying-in-wait. This behavior might include, for example, the duck's propensity to circle the pond 22 prior to landing; the duck's propensity to call to one or more decoys 26 it perceives to be other live ducks; and the duck's reactions to certain duck calls made by the hunter.

The step of modeling the perspective of the thing related to the behavior in terms understandable by the student, as depicted in box 12, involves generating or obtaining a model operable to accurately describe the perspective, particularly visual, audible, tactile, and olfactory sensory cues, of the thing with regard to the behavior of interest. The model may take any form which is appropriate and suitable for communicating the perspective of the thing to the student given the mechanism for implementing the model. In some cases, the model will dictate the nature of the mechanism, as, for example, when the model relates to visual perspectives, in which case the mechanism must have a display component; in other cases, the mechanism will dictate the nature of the model, as, for example, when the only cost effective mechanism is prerecorded video, in which case the model must be adapted to a provide a presentation using only a visual and audible format.

Figure 2:
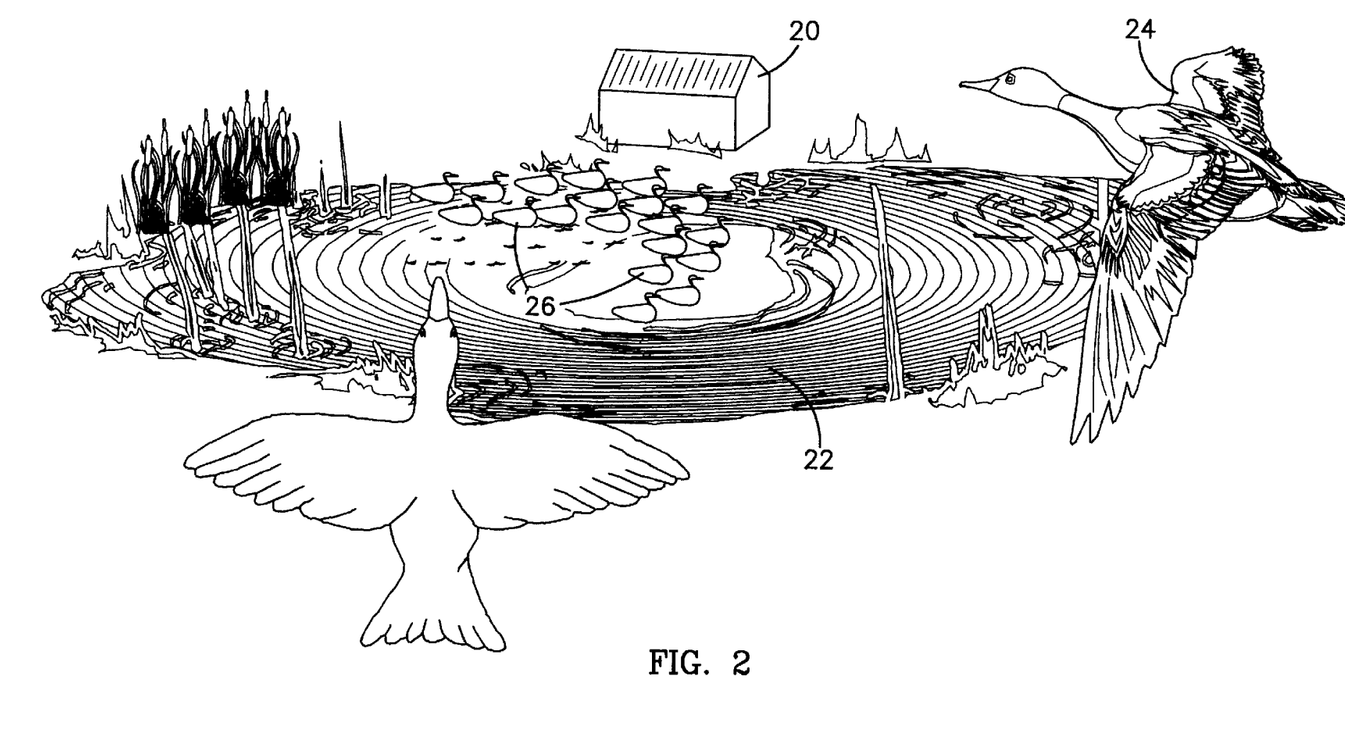
FIG. 2 is a perspective view looking down on an area of land associated with duck hunting, wherein the perspective is that of a flying duck.

Referring also to FIG. 2, continuing the duck hunting example, the duck 24, while circling the pond 22 or other potential landing area, may see a variety of views of the blind 20, including a backside, rather than just a side of the blind 20 facing the pond 22. If the student does not know of the duck's circling behavior, then he or she may not anticipate a need to camouflage all sides of the blind 20. Similarly, being familiar with only a two-dimensional human perspective, it may not occur to the hunter to camouflage a top side of the blind 20. Furthermore, when calling to the numerous decoys 26, the duck may hear only one return call coming from the blind 20 rather than from the decoys 26. If the student does not appreciate the duck's changing perspective as it circles, then he or she may not anticipate that the duck 24 may locate the return call as being from a source or location other than the decoys 26. Additionally, if the student does not know of the significance associated with decoy numbers and arrangement, then he or she may not anticipate the duck's reaction to the decoys 26. Additionally, the duck's call may have a particular meaning which is incompatible with the return call, or the return call may be inappropriate for the situation. If the student does not appreciate the variety and complexity of the duck's calls, then he or she may not understand that an incompatible or inappropriate return call may be interpreted by the duck 24 as an indication of danger. Thus, the student stands to gain great insight into duck behavior by exposure to the duck's perspective, and, through such insight and understanding, improve tremendously in hunting skill and technique.

The step of implementing the model using an appropriate mechanism, as depicted in box 14, involves selecting an appropriate mechanism, based potentially upon a variety of considerations, and implementing the model using the mechanism such that the perspective may be effectively communicate to the student. Thus, it is through the mechanism that the student experiences and gains a better understanding of the thing's perspective, thereby improving the student's skill. As mentioned, the nature of the mechanism may depend at least partly upon the nature of the model, but may also depend upon or be dictated by a variety of other considerations, including, for example, cost, space, location, and student ability. Potential mechanisms include, for example, prerecorded video, computer animation, virtual reality, and role-playing.

Continuing the duck hunting example, the duck 24 and one or more simulated hunting environments may be created using computer animation and presented as an interactive computer-based presentation. An interactive ability allows the student a measure of control over the presentation, thereby increasing its efficacy. The student may, for example, be provided with an ability to skip, speed up, or review sections of the presentation. In more complex computer-based presentations, the student may be provided with an ability to change features of the hunting environment, including, for example, tree and vegetation density, land contour, and pond shape; re-arrange or add to or subtract from the decoys 26; and return different calls in response to the duck's calls, thereby adapting the presentation to more accurately reflect an actual hunting area and allowing the student to test a variety of scenarios.

The step of introducing the student to the mechanism such that through the mechanism, the student is exposed to and can experience the perspective of the thing and thereby better understand the behavior, as depicted in box 16, involves immersing the student in the perspective of the thing so that the student gains a better understanding of the behavior of the thing through first-hand experience. This step will depend greatly on the nature of the mechanism. Prerecorded video, relatively simple computer animation, and, in some cases, role-playing mechanisms may be provided to the student for use without further instruction or interaction. Relatively complex computer animation and virtual reality mechanisms may require that the student be introduced to the mechanism at a special facility where additional instruction or interaction may be provided.

Continuing the duck hunting example, the interactive computer-based presentation may be provided to the student via a local area network or a wide area network, such as the Internet. A computer program underlying the computer-based presentation may comprise a combination of code segments written in any suitable programming language, such as, for example, Java or C++, and stored in or on any suitable computer-readable memory medium, such as, for example, a hard drive or compact disk on a conventional server for access via the network by a conventional personal computer. This allows students, wherever they may be, to logon to the presentation and benefit therefrom.

Figure 3:
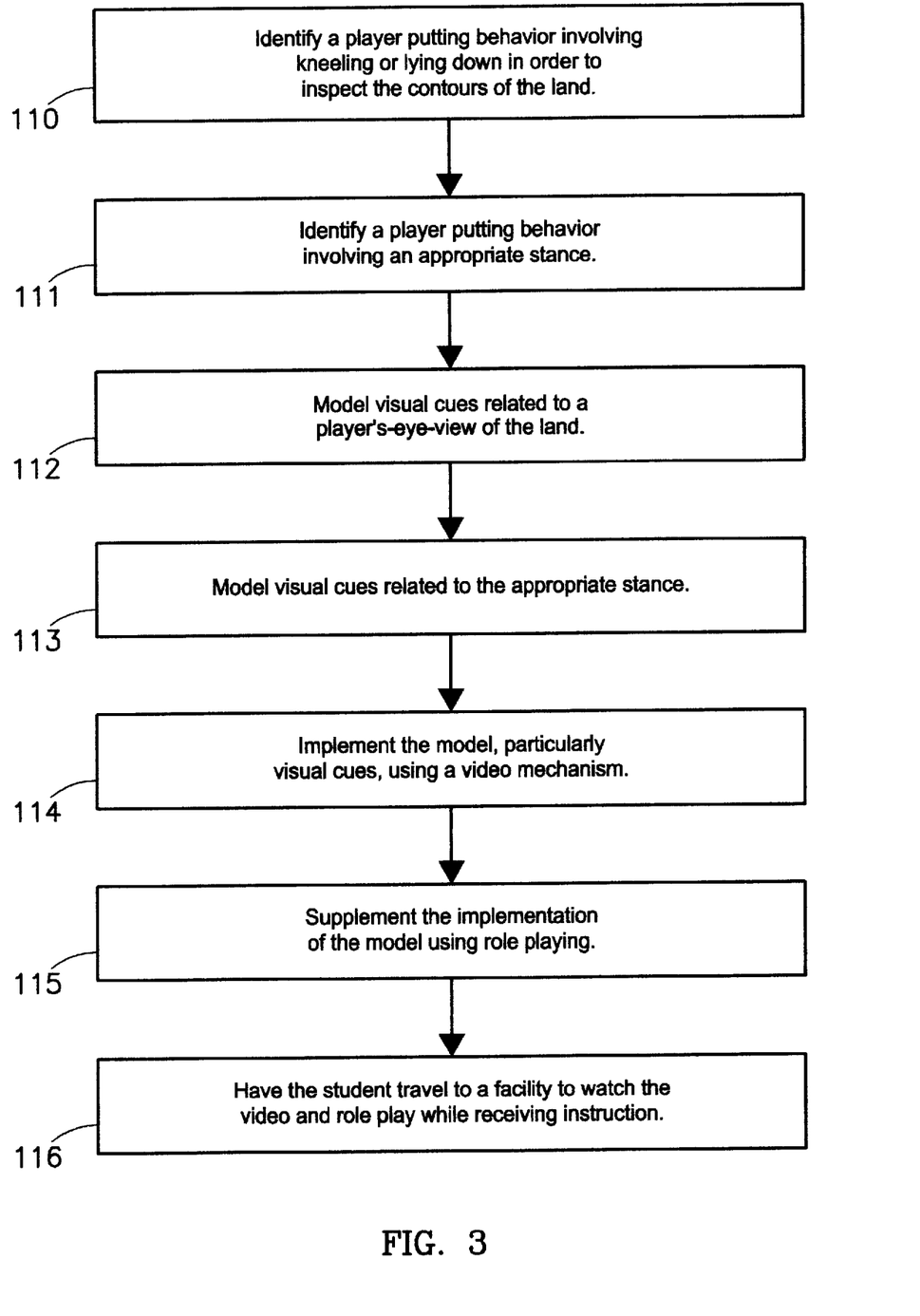
FIG. 3 is a flowchart showing a second sequence of example-specific steps based upon the general steps of FIG. 1.
Figure 4:
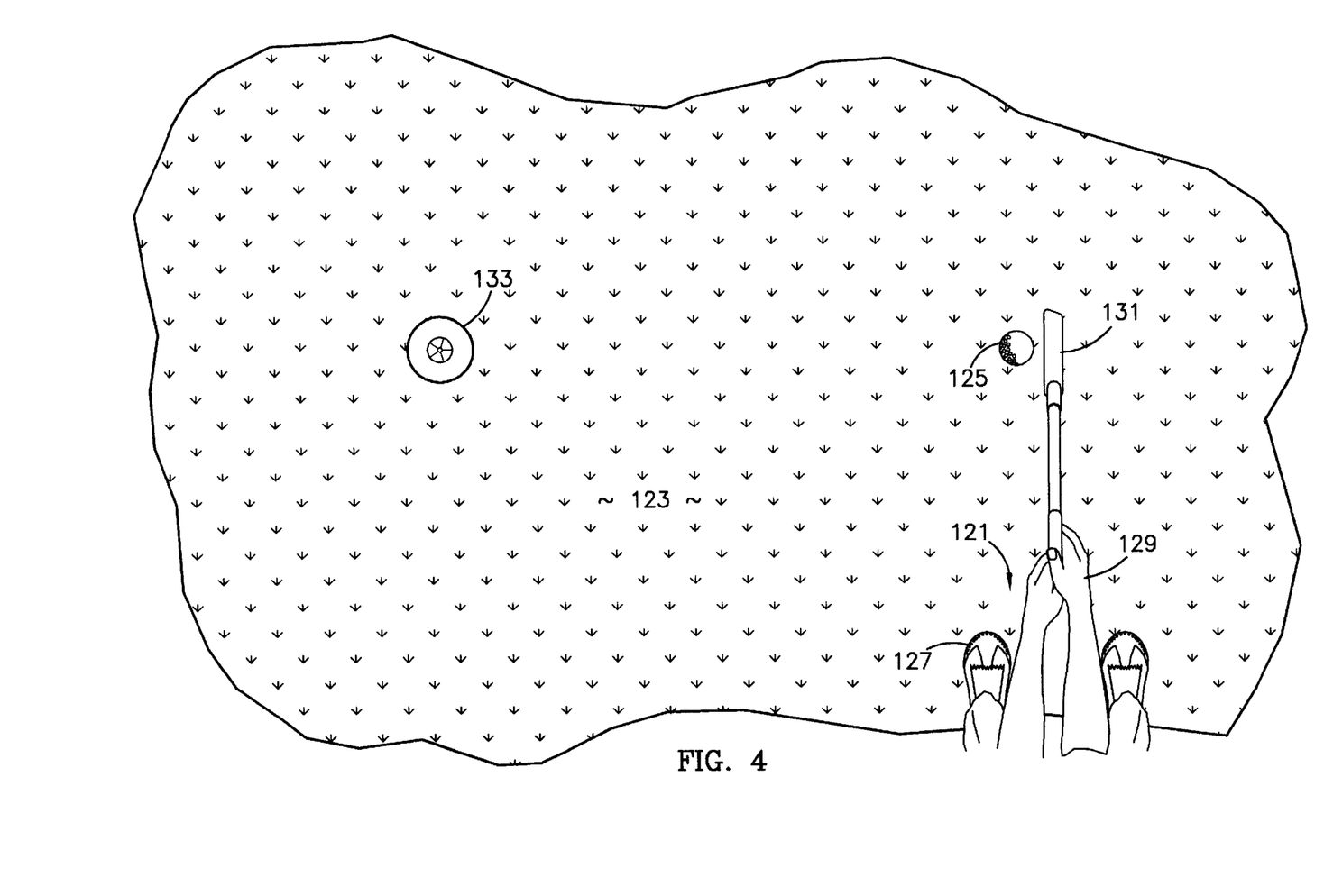
FIG. 4 is a perspective view looking down on an area of land associated with putting a golf ball, wherein the perspective is that of a golfer.

Referring also to FIGS. 3 and 4, in another example, given the general steps heretofore described, the method may be used to teach a skill involving an aspect of playing a game, such as, for example, golf, tennis, or poker, whereby the student experiences the perspective of a player 121 concerning the aspect of playing the game. Implementation of the method begins by identifying a behavior of the player 121 related to the aspect of playing the game. For example, where the game is golf and the aspect is putting, the behavior may include kneeling or lying down in order to better inspect the contours of the land 123 over which a golf ball 125 must travel, as depicted in box 110. The behavior may then progress to adopting an appropriate stance given the contours of the land 123 and other considerations, as depicted in box 111.

Once the behavior is identified, the player's perspective must be modeled in terms understandable by the student. Thus, a player's-eye-view of the contours of the land 123 may first be shown, and then, once the player has adopted the proper stance, a player's-eye-view of the golf ball 125, the player's shoes 127, the player's grip 129; a golf club 131, and a cup 133 may be shown, as depicted in boxes 112 and 113.

Next, an appropriate mechanism must be selected and used to implement the model, wherein the mechanism is suitable for imparting to the student the perspective of the player 121. A video mechanism, for example, may be used to show the views discussed above, as depicted in box 114. Optionally, while watching the video the student may be required to role-play wherein the student adopts the behaviors to result in the student having the same perspectives shown on the video. Thus, in this latter embodiment, student will adjust his or her stance until he or she sees the same view as the player 121, as shown on the video, as depicted in box 115.

Lastly, the student must be introduced to the mechanism so that, through the mechanism, the student is able to experience the perspective of the player and to thereby better understand the behavior. Where the mechanism is a simple video, the student may watch it and learn in the privacy of their own home and at their own convenience. Alternatively, the student may travel to a facility wherein an instructor is able to assist the student while watching the video, as depicted in box 116.

Figure 5:
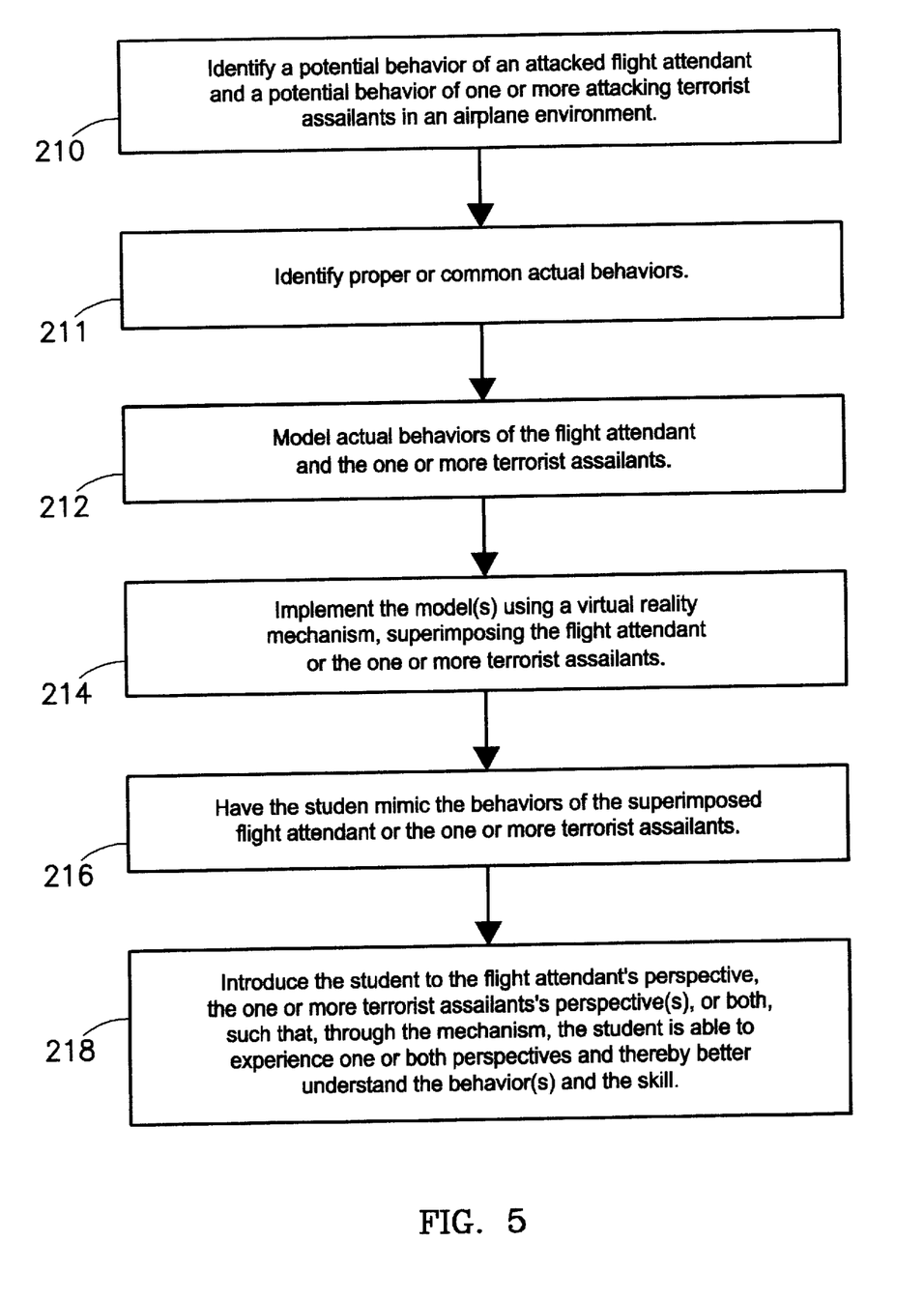
FIG. 5 is a flowchart showing a third sequence of example-specific steps based upon the general steps of FIG. 1.
Figure 6:
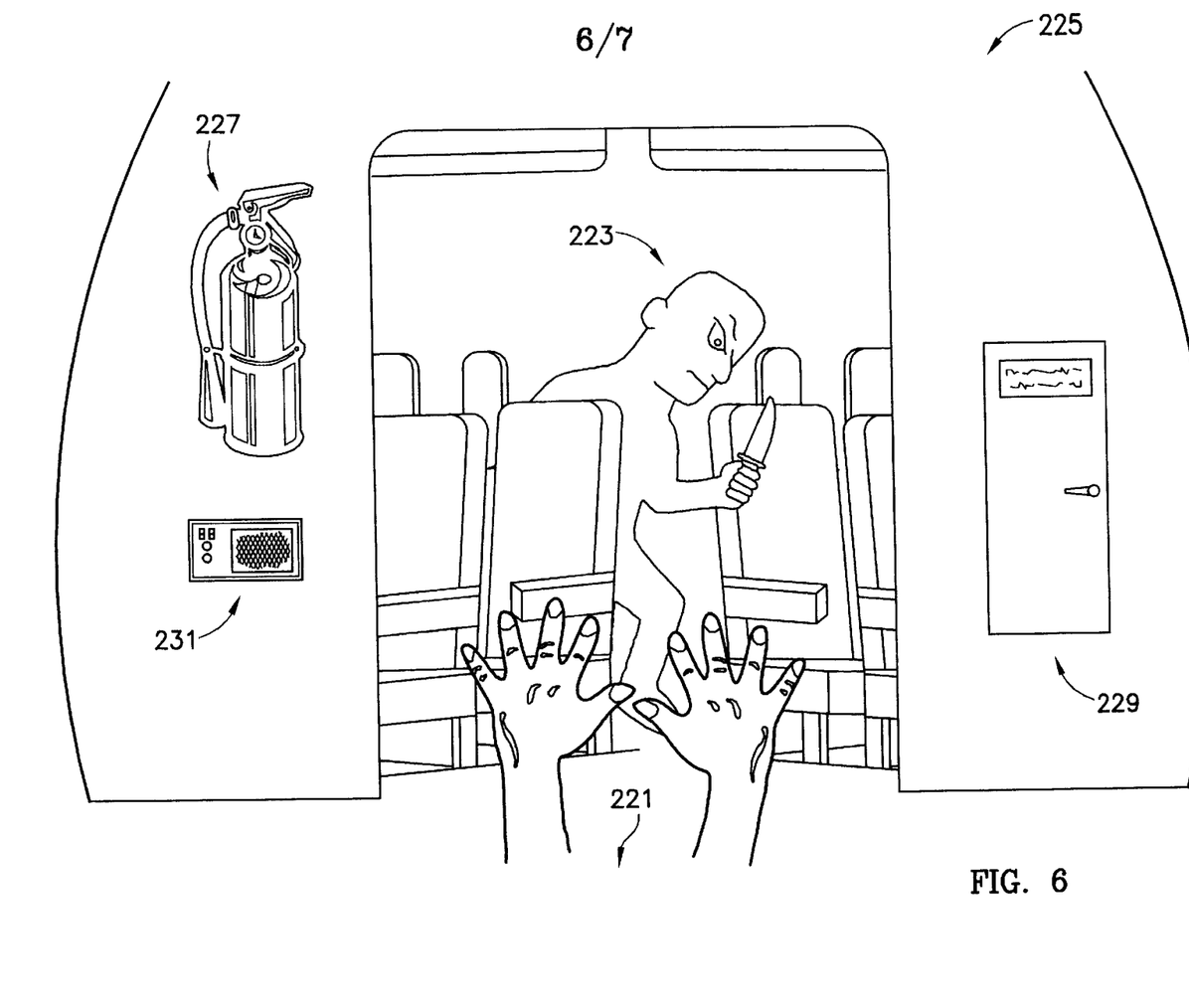
FIG. 6 is a perspective view of a flight attendant being attacked by a knife-wielding terrorist onboard an airplane.
Figure 7:
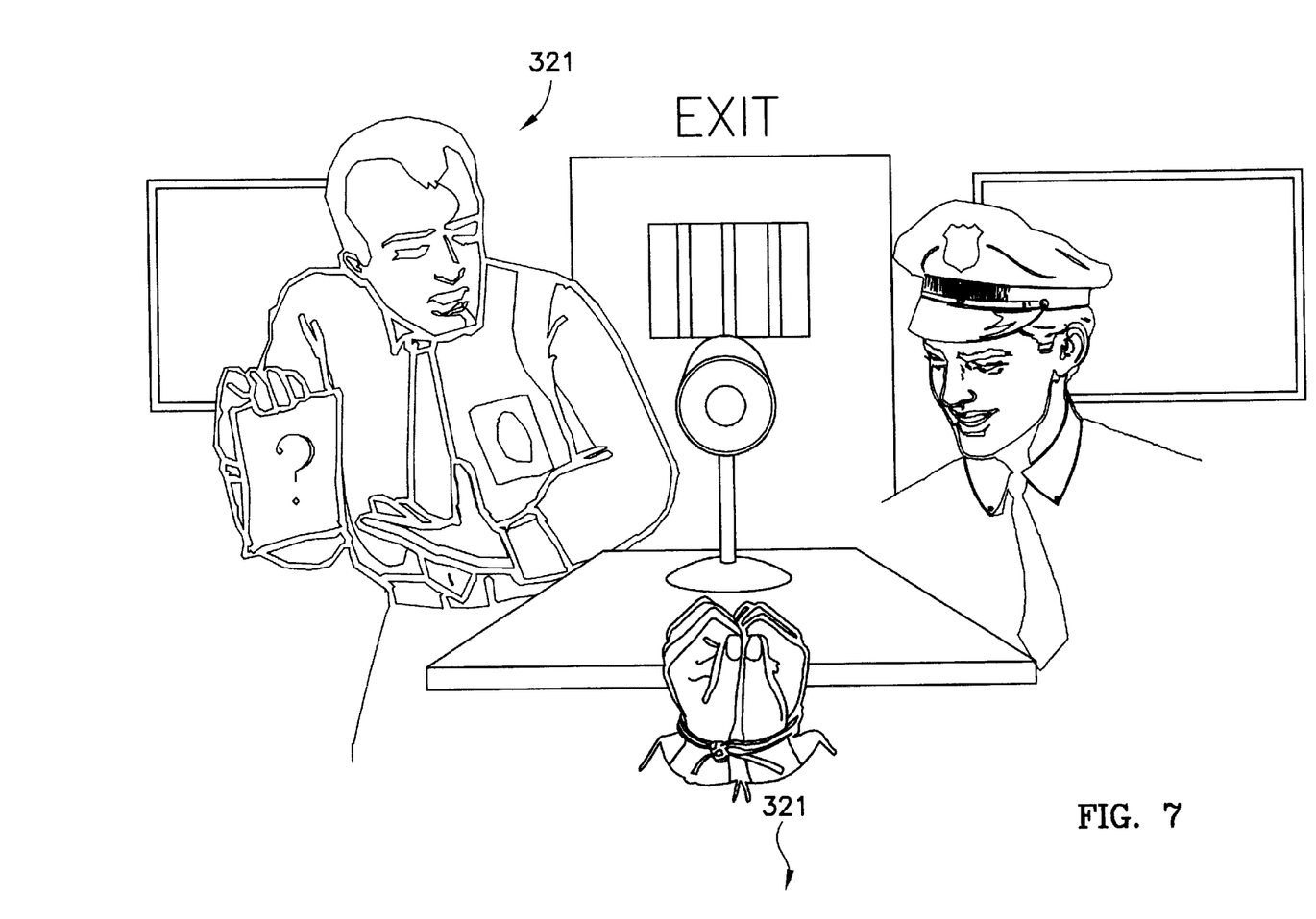
FIG. 7 is a perspective view of a criminal suspect undergoing an interrogation by two law enforcement officers.

Referring also to FIGS. 5–7, in another example, given the general steps heretofore described, the method may be adapted and used to teach a skill involving an aspect of law enforcement, terrorist response, or self-defense, such as, for example, close-quarter self-defense techniques against edged weapons, suspect interrogation, arrest procedures, terrorist recognition and identification, facial expression interpretation, traffic stop procedures, hand gun confrontation training, crime scene investigation training, cover and concealment training, hostile confrontation training (crowd and individual control), or personal protection and prevention measures. It will be appreciated that such training has application in a variety of fields and contexts, including, for example, law enforcement, military, private security, prison (guards), bank security, and airlines (pilots and flight attendants). As such, the relevant perspective may be that of one or both of the victim or the aggressor.

Adaptation of the above-described general method to the particular applications mentioned and to other applications is considered to be well within the abilities of one with ordinary skill in the relevant art. Thus, it is considered unnecessary to provide a detailed description of the steps in teaching these techniques. Nevertheless, an exemplary description is hereafter provided wherein the method has been adapted to teach an airline pilot or flight attendant how to respond to a knife-wielding terrorist assailant.

Referring particularly, to FIGS. 5 and 6, in accordance with the general steps heretofore described, implementation of the present method begins by identifying relevant potential behaviors of one or both of an attacked flight attendant 221 and one or more attacking terrorist assailants 223 in an airplane 225 environment, as depicted in box 210. These behaviors may include, for example, identifying the number of and location of the one or more assailants 223; identifying objects which may be used as weapons (e.g., a fire extinguisher 227) in self-defense; identifying potential objects (e.g., a removable panel door or cover 229) which may be used as shields; and identifying potential communications means (e.g., an intercom system 231) which may be used to notify or signal a pilot, another flight attendant or a passenger of the situation, as depicted in box 210. Then, from the identified potential behaviors, proper or common actual behaviors may be identified, as depicted in box 211.

Once the behaviors are identified, both the flight attendant's perspective and the terrorist assailant's perspective must be modeled in terms understandable by the student, as depicted in box 212. Thus, for example, the flight attendant's visual perspective of the airplane 225 and the assailant 223 may be considered important in such a model.

Next, an appropriate mechanism must be selected and used to implement the model, wherein the mechanism is suitable for imparting to the student the perspective of the flight attendant 221. A virtual reality mechanism, for example, may be used to create the airplane environment, as depicted in box 214, possibly superimposing the flight attendant 221 or terrorist assailant 223 over the student. Thus, the student can experience the same perspectives as the flight attendant 221 or the terrorist assailant 223. It may also be desirable to have the student mimic the actions of the superimposed flight attendant 221 or terrorist assailant 223, as depicted in box 216.

Lastly, the student must be introduced to the mechanism so that, through the mechanism, the student is able to experience the perspective of one or both of the flight attendant 221 or terrorist assailant 223, and thereby better understand and appreciate the proper behavior and skill, as depicted in box 218.

As mentioned, the student may be exposed to the flight attendant's perspective or to the assailant's perspective or both. Where both perspectives are used, the student may gain greater insight into the actions and behaviors of both parties.

Also as mentioned, a large variety of related or other techniques may be similarly taught using the present invention. Referring to FIG. 7, for example, interrogation or interview techniques may be taught from, again, the perspective of one or more law enforcement officers 321 conducting the interrogation, the perspective of a suspect 323 being interrogated, or both.

For the preceding description, it will be appreciated that the present invention provides a method of teaching a skill whereby a student is exposed to or otherwise experiences a perspective of a relevant thing, whether person, animal, or object, as determined by the nature of the skill, and wherein a mechanism is used to impart the perspective, thereby advantageously providing a better understanding of the behavior and an improvement in performance of the skill.

Although the invention has been described with reference to the preferred embodiments illustrated in the attached drawings, it is noted that equivalents may be employed and substitutions made herein without departing from the scope of the invention as recited in the claims. For example, as mentioned, suitable and appropriate mechanisms, such as prerecorded video, computer animation, virtual reality, and role-playing, may be employed for conveying to the student the perspective of the thing, and the present invention is generally independent of any particular mechanism.

Having thus described the preferred embodiment of the invention, what is claimed as new and desired to be protected by Letters Patent includes the following:

1. A method of teaching a fundamental skill to a student, whereby the student is exposed to a perspective of one or more persons whose identity is determined by the fundamental skill, the method comprising the steps of:
    (a) identifying a behavior of the one or more persons, wherein the behavior is related to the fundamental skill;
    (b) modeling a perspective of the one or more persons related to the behavior in terms understandable by the student;
    (c) implementing the model using a mechanism suitable for imparting to the student the perspective of the one or more persons; and
    (d) introducing the student to the mechanism such that, through the mechanism, the student is able to experience the perspective of the one or more persons and to thereby better understand the behavior and the fundamental skill.

2. The method as set forth in claim 1, wherein the skill is related to a field selected from the group consisting of: law enforcement, military, private security, prison security, bank security, and airline flight.

3. The method as set forth in claim 1, wherein the skill is selected from the group consisting of: self-defense, use of edged weapons, self-defense against edged weapons, suspect interrogation, arrest procedures, terrorist recognition and identification, facial expression interpretation, traffic stop procedures, use of hand guns, confrontation involving a hand gun training, crime scene investigation, cover and concealment, hostile confrontation, crow confrontation, individual confrontation, and personal protection.

4. The method as set forth in claim 1, wherein the student is selected from the group consisting of: law enforcement officer, soldier, security guard, airplane pilot, and airline flight attendant.

5. The method as set forth in claim 1, wherein the one or more persons is selected from the group consisting of: victim, attacked person, criminal, enemy soldier, aggressor, and terrorist.

6. The method as set forth in claim 1, wherein a video recording is the mechanism for implementing the model and imparting the perspective of the one or more persons.

7. The method as set forth in claim 1, wherein a computer program involving computer animation is the mechanism for implementing the model and imparting the perspective of the one or more persons.

8. The method as set forth in claim 1, wherein a role-playing scenario is the mechanism for implementing the model and imparting the perspective of the one or more persons.

9. The method as set forth in claim 1, wherein virtual reality is the mechanism for implementing the model and imparting the perspective of the one or more persons.

10. The method as set forth in claim 9, wherein student is required to act out behaviors in a virtual reality environment wherein the one or more persons are superimposed, thereby allowing the student to mimic the behavior of the superimposed one or more persons while experiencing the one or more persons' perspective.

11. A method of teaching a law enforcement-related skill to a student, whereby the student is exposed to two or more alternative perspectives of two or more persons whose identities are determined by the skill, the method comprising the steps of:
    (a) identifying a first behavior of a first one of the two or more persons, wherein the behavior is related to the skill;
    (b) modeling a perspective of the first one of the two or more persons related to the first behavior in terms understandable by the student;
    (c) identifying a second behavior of a second one of the two or more persons, wherein the behavior is related to the skill;
    (d) modeling an alternative perspective of the second one of the two or more persons related to the second behavior in terms understandable by the student;
    (e) implementing the model using a mechanism suitable for imparting to the student the perspective of the first one of the two or more persons and the alternative perspective of the second one of the two or more persons; and
    (f) introducing the student to the mechanism such that, through the mechanism, the student is able to experience the perspective and the alternative perspective and to thereby better understand the first behavior and the second behavior and the skill.

12. The method as set forth in claim 11, wherein the skill is selected from the group consisting of: self-defense, use of edged weapons, self-defense against edged weapons, suspect interrogation, arrest procedures, terrorist recognition and identification, facial expression interpretation, traffic stop procedures, use of hand guns, confrontation involving a hand gun training, crime scene investigation, cover and concealment, hostile confrontation, crow confrontation, individual confrontation, and personal protection.

13. The method as set forth in claim 11, wherein the first one of the two or more persons is selected from the group consisting of: victim and law enforcement officer.

14. The method as set forth in claim 11, wherein the second one of the two or more persons is selected from the group consisting of: criminal, aggressor, and terrorist.

15. The method as set forth in claim 11, wherein a video recording is the mechanism for implementing the model and imparting the perspective and the alternate perspective.

16. The method as set forth in claim 11, wherein a computer program involving computer animation is the mechanism for implementing the model and imparting the perspective and the alternate perspective.

17. The method as set forth in claim 11, wherein a role-playing scenario is the mechanism for implementing the model and imparting the perspective and the alternate perspective.

18. The method as set forth in claim 11, wherein virtual reality is the mechanism for implementing the model and imparting the perspective and the alternate perspective.

19. The method as set forth in claim 18, wherein student is required to act out behaviors in a virtual reality environment wherein the two or more persons are superimposed, thereby allowing the student to mimic the behavior of the superimposed two or more persons while experiencing the perspective and the alternate perspective.

20. A method of teaching a terrorist response-related skill to a student, wherein the student is associated with an airline flight, whereby the student is exposed to two or more alternative perspectives of two or more persons whose identities are determined by the skill, the method comprising the steps of:
    (a) identifying a first behavior of a first one of the two or more persons, wherein the behavior is related to the skill;
    (b) modeling a perspective of the first one of the two or more persons related to the first behavior in terms understandable by the student;
    (c) identifying a second behavior of a second one of the two or more persons, wherein the behavior is related to the skill;
    (d) modeling an alternative perspective of the second one of the two or more persons related to the second behavior in terms understandable by the student;
    (e) implementing the model using a mechanism suitable for imparting to the student the perspective of the first one of the two or more persons and the alternative perspective of the second one of the two or more persons; and
    (f) introducing the student to the mechanism such that, through the mechanism, the student is able to experience the perspective and the alternative perspective and to thereby better understand the first behavior and the second behavior and the skill.

21. The method as set forth in claim 20, wherein the skill is selected from the group consisting of: self-defense, use of edged weapons, self-defense against edged weapons, terrorist recognition and identification, facial expression interpretation, use of hand guns, confrontation involving a hand gun training, hostile confrontation, terrorist confrontation, and personal protection.

22. The method as set forth in claim 20, wherein the first one of the two or more persons is selected from the group consisting of: victim, flight attendant, pilot, passenger.

23. The method as set forth in claim 20, wherein the second one of the two or more persons is selected from the group consisting of: criminal, aggressor, and terrorist.

24. The method as set forth in claim 20, wherein a video recording is the mechanism for implementing the model and imparting the perspective and the alternative perspective.

25. The method as set forth in claim 20, wherein a computer program involving computer animation is the mechanism for implementing the model and imparting the perspective and the alternative perspective.

26. The method as set forth in claim 20, wherein a role-playing scenario is the mechanism for implementing the model and imparting the perspective and the alternative perspective.

27. The method as set forth in claim 20, wherein virtual reality is the mechanism for implementing the model and imparting the perspective and the alternative perspective.

28. The method as set forth in claim 27, wherein the student is required to act out behaviors in a virtual reality environment wherein the two or more persons are superimposed, thereby allowing the student to mimic the behavior of the superimposed two or more persons while experiencing the perspective and the alternate perspective.

29. A method of teaching a skill to a student, whereby the student is exposed to a perspective of one or more persons whose identity is determined by the skill, the method comprising the steps of:
    (a) identifying a proper behavior of the one or more persons, wherein the proper behavior is related to the skill;
    (b) modeling a perspective of the one or more persons related to the proper behavior;
    (c) implementing the model using a mechanism suitable for imparting to the student the perspective of the one or more persons; and
    (d) introducing the student to the mechanism such that, through the mechanism, the student is able to experience the perspective of the one or more persons and to thereby better understand the proper behavior and a benefit thereof and better understand the skill.

30. A method of teaching a skill to a student, whereby the student is exposed to a perspective of one or more persons whose identity is determined by the skill, the method comprising the steps of:
    (a) identifying a proper behavior of the one or more persons, wherein the proper behavior is related to the skill;
    (b) modeling a first perspective of the one or more persons related to the proper behavior;
    (c) identifying an improper behavior of the one or more persons, wherein the improper behavior is related to the skill;
    (d) modeling a second perspective of the one or more persons related to the improper behavior;
    (e) implementing the model using a mechanism suitable for imparting to the student the first perspective and the second perspective of the one or more persons; and
    (f) introducing the student to the mechanism such that, through the mechanism, the student is able to experience the first perspective and the second perspective of the one or more persons and to thereby better understand the proper behavior and a benefit thereof and the improper behavior and a consequence thereof and to thereby better understand the skill.

* * * * *